United States Patent
Raith

(10) Patent No.: US 6,687,504 B1
(45) Date of Patent: Feb. 3, 2004

(54) METHOD AND APPARATUS FOR RELEASING LOCATION INFORMATION OF A MOBILE COMMUNICATIONS DEVICE

(75) Inventor: Alex Krister Raith, San Diego, CA (US)

(73) Assignee: Telefonaktiebolaget L. M. Ericsson, Stockholm (SE)

( * ) Notice: Subject to any disclaimer, the term of this patent is extended or adjusted under 35 U.S.C. 154(b) by 488 days.

(21) Appl. No.: 09/627,938

(22) Filed: Jul. 28, 2000

(51) Int. Cl.[7] .................................................. H04Q 7/20
(52) U.S. Cl. .............................. 455/456.1; 455/404.2; 455/411
(58) Field of Search .............................. 455/456, 404.2, 455/411, 440

(56) References Cited

U.S. PATENT DOCUMENTS

| | | | | |
|---|---|---|---|---|
| 6,073,005 A | * | 6/2000 | Raith et al. ................... | 455/404 |
| 6,115,596 A | * | 9/2000 | Raith et al. ................... | 455/404 |
| 6,154,657 A | * | 11/2000 | Grubeck et al. ............. | 455/456 |
| 6,195,557 B1 | * | 2/2001 | Havinis et al. .............. | 455/456 |
| 6,240,285 B1 | * | 5/2001 | Blum et al. .................. | 455/404 |

FOREIGN PATENT DOCUMENTS

| EP | 810803 A2 | * | 3/1997 | ............ H04Q/7/22 |
|---|---|---|---|---|
| WO | WO94/29995 | * | 12/1994 | ............ H04M/11/00 |

* cited by examiner

*Primary Examiner*—William Trost
*Assistant Examiner*—Stephen D'Agosta
(74) *Attorney, Agent, or Firm*—Coats & Bennett, PLLC

(57) ABSTRACT

There is provided a device, comprising a positioner configured to determine, at least in part, a position of the device and a request processor for processing and selectively responding to requests for information regarding the position of the device. The positioner comprises a GPS receiver used to calculate the position of the device. A communications network in which the device operates may finally calculate the position. Further, the device may be configured to automatically respond to certain network management location information requests, which are generated by a communications network in which the device operates. The device may also be configured to automatically respond to information requests that result from an emergency communication initiated by the user or that originate from certain specified agencies. Alternatively, the device may be programmed to respond to certain request types depending on input from the user of the device. The request types may be related to services and events that are based on the location of the device or that are based on input from the user.

20 Claims, 3 Drawing Sheets

METHOD AND APPARATUS FOR RELEASING LOCATION INFORMATION OF A MOBILE COMMUNICATIONS DEVICE

BACKGROUND OF THE INVENTION

1. Field of the Invention

The invention relates generally to wireless mobile communications, and more particularly to a method and apparatus for releasing location information of a mobile device.

2. Background

There are several reasons why it would be desirable for a mobile device to be able to determine its geographic position. For example, The U.S. Federal Communications Commission (FCC) has mandated that U.S. cellular and PCS carriers support Emergency dialing (E911) supplemented by the location of the mobile. The FCC left it up to the wireless industry to chose the technology used when acquiring the position of the mobile device. The acquisition process can be based on one of the following methods: (1) a measurement by the network entity or basestation; (2) a derivation of the position in the mobile device (e.g. by using a GPS receiver), with the mobile device transmitting the position to the network entity when required; or (3) a combination of these two methods. An example of a combination (3) would be where the derivation in the mobile only involves the pre-processing of some positional data, with the network performing the final processing steps.

It is anticipated that method (2) will be the most common implementation, potentially augmented by a measurement by the network, i.e. method (3), for increased accuracy or in cases where the mobile-based method will not function well. Therefore, mobile devices, at least within a cellular or PCS network, will commonly have the ability to determine their position. Other applications in addition to E911 can use this "location determination" ability. For example, it has been shown that there are commercial location based services that users of the devices would be willing to use, even if they had to pay for each use. It was previously assumed, however, that the network would determine, or at least control, the location information. This approach raises a concern with regard to privacy of the mobile device user. In other words, the user of the device may want to control the release of the location information for all non-emergency uses. If this concern is not addressed, then slower growth in the number of users and usage of cellular networks may result. Because if a user does not feel confident that his location will not be released to parties beyond the user's control, the user may turn off their phone resulting in less communication and, therefore, less revenue for the cellular providers.

SUMMARY OF THE INVENTION

In accordance with one aspect of the invention, there is provided a device, comprising a positioner configured to determine, at least in part, a position of the device and a request processor for processing and selectively responding to requests for information regarding the position of the device. In a preferred embodiment, the positioner comprises a GPS receiver used to calculate the position of the device. In another preferred embodiment a communications network in which the device operates finally calculates the position.

Further, in one embodiment, the device is configured to automatically respond to certain network management location information requests, which are generated by a communications network in which the device operates. In alternative embodiments, the device is configured to automatically respond to information requests that result from an emergency communication initiated by the user or that originate from certain specified agencies.

In still further embodiments, the device is programmed to respond to certain request types depending on input from the user of the device. Depending on the embodiment, the request types are related to services and events that are based on the location of the device or that are based on input from the user.

In another embodiment, the device further comprises a memory configured to store certain attributes related to the location information requests, and in another embodiment, the request processor is implemented in software.

Other features and embodiments will be made clear in the description below in conjunction with the following drawings.

DETAILED DESCRIPTION OF THE PREFERRED EMBODIMENTS

Figure 1:
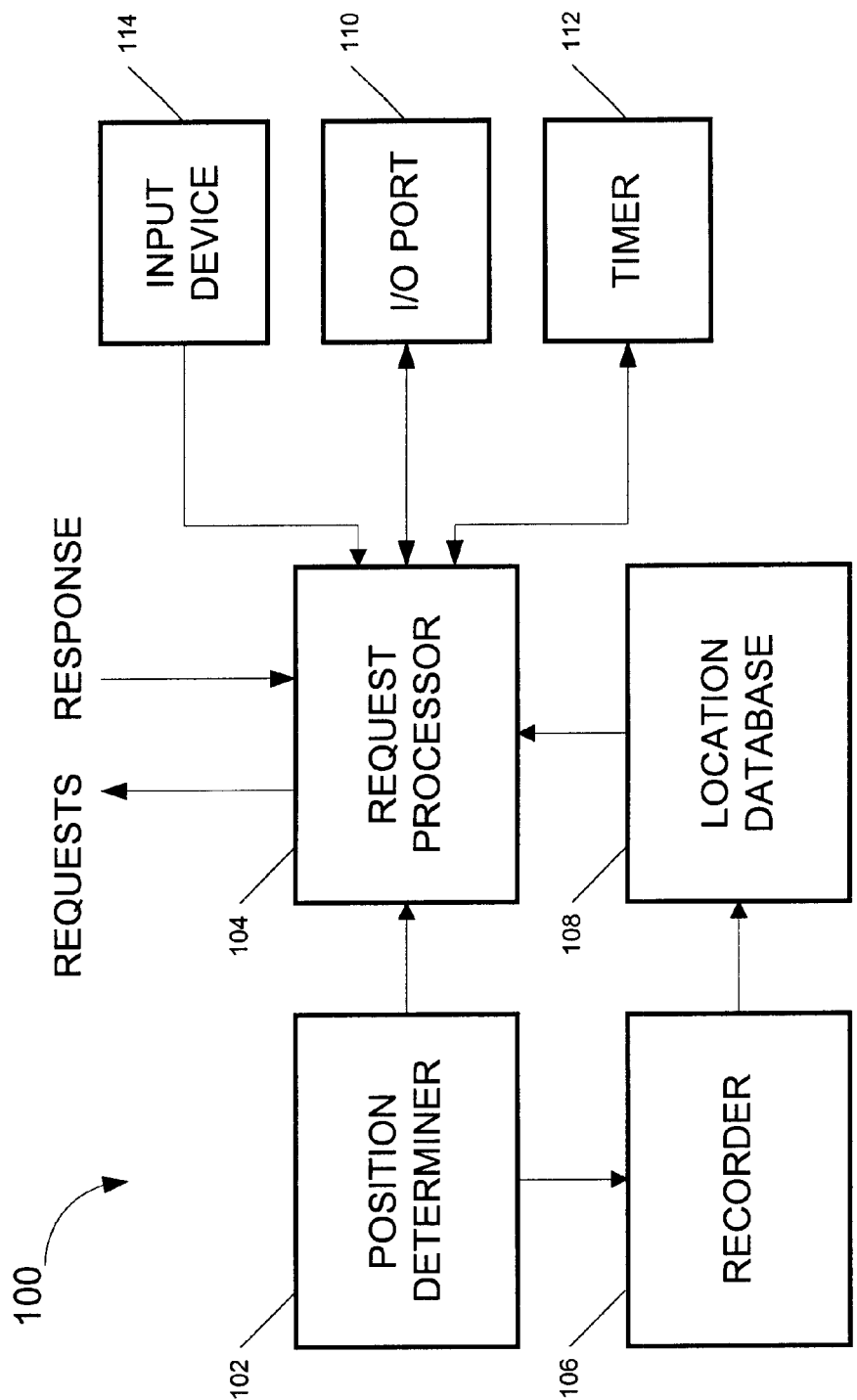
FIG. 1 is a block diagram illustrating a device in accordance with one embodiment of the invention.

FIG. 1 illustrates one example embodiment of a device 100 that is configured to control the release of location information relating to device 100. For example, device 100 may be a mobile device in a wireless communications system. Included in device 100 are a positioner 102, a request processor 104, and a recorder 106. Positioner 102 is responsible for determining the position of device 100. This may be a full determination or a partial determination depending on the implementation. Request processor 104 receives location information requests and determines whether to respond by releasing the mobile device's location information. Depending on the implementation, there are a variety of factors that go into this determination. Recorder 106 is responsible for recording information related to the information requests. In certain implementations, recorder 106 records information for every information request. While in other implementations, recorder 106 only records information for certain information requests.

As noted, there are a variety of methods for determining the position of device 100. In some cellular systems, a mobile device is in contact with multiple base stations at the same time. Each base station is also equipped with a GPS receiver. Therefore, the position of mobile devices can be determined by the system through a triangulation process. For the mobile device to control the release of location information, however, the mobile device must be capable of determining its position, at least in part, on its own. Thus, device 100 includes positioner 102.

In a typical embodiment, positioner 102 is fully capable of determining the position of device 100, without assistance from the system or network. For example, positioner 102 may comprise a GPS receiver used to calculate the position.

Where, however, positioner 102 is a GPS receiver, but device 100 is operating indoors, the GPS receiver may not work well. In this case, positioner 102 may still find the position, but this position may be augmented by a determination from the network. In some implementations the position is only partially derived in device 100 and the communications network, for example, determines the full position. Thus, positioner 102 may only perform pre-processing of positional information that is then sent to the network for final processing.

Request processor 104 must determine whether to release the information when it receives a location information request. There are several possible approaches that can be implemented by request processor 104 in making this determination. For example, the release of the location information can be externally controlled with no exceptions. Alternatively, the release of information can be externally controlled, but in order to provide the user of the device 100 with some oversight, the recorder 106 records the reasons for each request after the release of location information. The user of device 100 may then review the recorded reasons to ensure that the location information requests are being used properly. While the second of these possibilities somewhat addresses privacy concerns, the first does not. Therefore, one alternative implementation that fully, or nearly fully, addresses privacy concerns is to have the release of location information fully controlled by the user. There are alternative implementations that fully, or nearly fully, address privacy, but also addresses safety concerns. For example, release of the location information maybe controlled by the user with an exception when the request is related to an emergency communication initiated by the user. A look at the different types of location information requests will illustrate approaches for various situations and implementations.

First, in the context of a communications network, there are some important reasons for the communications network to access the location of a mobile device. For example, network management functions such as verifying adequate radio coverage, assisting in handoff procedures, tracking stolen mobiles, and monitoring malfunctioning mobiles, can all be enhanced through access to the location information. Additionally, the user may be assigned a "home-area," where preferential pricing is employed in a location based billing system. Therefore, in one implementation, the request processor will automatically release the location information whenever it receives a network management request for billing.

In an alternative embodiment, recorder 106 records information related to each location information request. For example, the recorder 106 may record the information in a location database 108 (discussed below). The mobile device user may then review the recorded information to ensure that the network management location information requests are proper. For example, as will be discussed in more detail below, the recorded information may include a text message that provides a reason for the position request.

In a further implementation, when request processor 104 determines that it will not release the information, it will return a message indicating that the request is denied. This way the requesting entity will realize the reason it did not receive the information is that device 100 received the request and denied it as opposed to the request not reaching device 100. It is also possible that the return message to the network incorporates a reason for the denial.

In still further implementations, the information release is under the control of the device user. Thus, request processor 104 must obtain user approval before releasing the location information. This can be accomplished in several ways. First, the user of the device can program the device so that network management requests automatically result in the release of the location information. For example, a mobile device is typically equipped with an input device 114, such as a keypad, that the user of the device can use to program the device. It may, however, be more convenient for the user of the device to employ an external device, such as a computer or PDA, to program the mobile device 100. Therefore, an alternative implementation includes an I/O port 110 that the user of the device uses to download instructions from the external device to request processor 104.

Another situation, where a user of the device will likely prefer that request processor automatically release the location information is when the request results from an emergency communication initiated by the user of the device. For example, in the U.S. the user may initiate an emergency communication by dialing "911." Alternatively, the mobile device may be equipped with a special button or key that automatically places an emergency call. Because the user initiates the emergency call in order to obtain assistance, it may be vital to include the position information. For example, if the call is terminated prematurely, due to poor radio coverage or other network problem, or if the user is incapacitated and unable to complete the call, the network can relay the location information to the relevant emergency service agency. Further, it may be useful for the emergency service agency to be able to poll the request processor and receive an updated location of the device. Selecting that emergency callbacks automatically result in location information release is, therefore, an attractive approach.

In one embodiment, a timer 112 is included in device 100. When the user of the device initiates an emergency communication, the timer is also initiated. If an incoming communication occurs within a certain time window following the emergency communication initiation, then it is assumed to be a callback from an emergency service agency and the request processor 104 will, therefore, automatically release the location information. It should be noted that the communication may not be from an emergency service agency. It is assumed, however, that this is a risk the user is willing to take under these circumstances.

The request processor 104 automatically responds to location information requests from certain agencies under certain conditions. For example, request processor 104 may also be programmed to automatically respond to a location information request generated by the FBI to further a criminal investigation. It should be noted that there is currently no mandate in the U.S. that the location of the mobile device be made available to law enforcement or any other agencies. But in the event that it is mandated this implementation can be tailored appropriately.

The previous implementations dealt with situations where a user of the device likely would prefer that device 100 respond independent of user intervention to location information requests, or at least would prefer that they be able to select independent response under certain conditions. There are situations, however, where the user will want to have greater control over the release of location information. One method of providing more extensive user control is implemented through the use of a user control file (UCF) that the user can use to select one of several possible modes. For example, the UCF may include the following modes: (1) autonomous release of position without providing a notification to the user of the request; (2) autonomous release of position information, while providing a notification to the user of the request; and (3) user interaction required in order to release the position information. The UCF may then be acquired by the network, for example, and used to enable certain types of features. Thus, if mode (1) or (2) is selected, the network can use network management location information requests in order to improve handoff efficiency or service coverage quality, etc. With regard to commercial location-based services, however, the user may be more inclined to select mode (3).

The commercial location-based service may be simple. For example, the user may use the mobile device to access an Internet site, and the site may request the location of the device. In one implementation, the user enters the information through input device 114, after first retrieving it from positioner 102. In another implementation, the user approves the release of the information and request processor 104 releases the location without requiring the user of the device to manually enter the data. Alternatively, request processor 104 may be programmed to automatically release the location to sites that the user of the device accesses.

In the commercial setting, there is also the issue of whether the mobile will poll the server to determine if information is available, or whether the server will look for certain information and then poll the mobile device when it finds the information. Therefore, in one implementation, the user of the device may set up the mobile device to poll the network periodically to see if certain pre-specified information is available. If the information is available, then the network informs the user of the device via the mobile and the user of the device can access a related site.

There are also commercial location-based service situations where a server is programmed to ask the mobile for its position either periodically or when triggered by a specific event. For example, an application residing in a server within the location based service network may poll the mobile device to determine whether the user has arrived in a predetermined area. When a trigger based on the location is enabled in the server, the server may transmit (push) content to the mobile device. An exemplary location-based "push service" is used to inform the user that a nearby shop has started a sale. The server may periodically check for this type of information on the Internet. The user may have entered a desired set of products into the server that he may purchase if there is a certain price available. When the user is in the vicinity of such a shop, the server may send a notification about the shop and associated product and price information. Many other such location-based services are envisioned. Of course, the "programming" of the user's desire in the exemplary application above could take place in the mobile device, and the device could periodically, through a wireless data service with Internet connection, check for the data and then inform the user when it is in the vicinity. Whether the user programs the server or the mobile device, it may be more convenient to perform the programming at a regular computer, e.g. a personal or laptop computer, due to its more elaborate user interface and large screen. Thus, in implementations of device 100 that include an I/O port for connecting to a computer, programming device 100 via the computer is contemplated by the invention.

Figure 2:
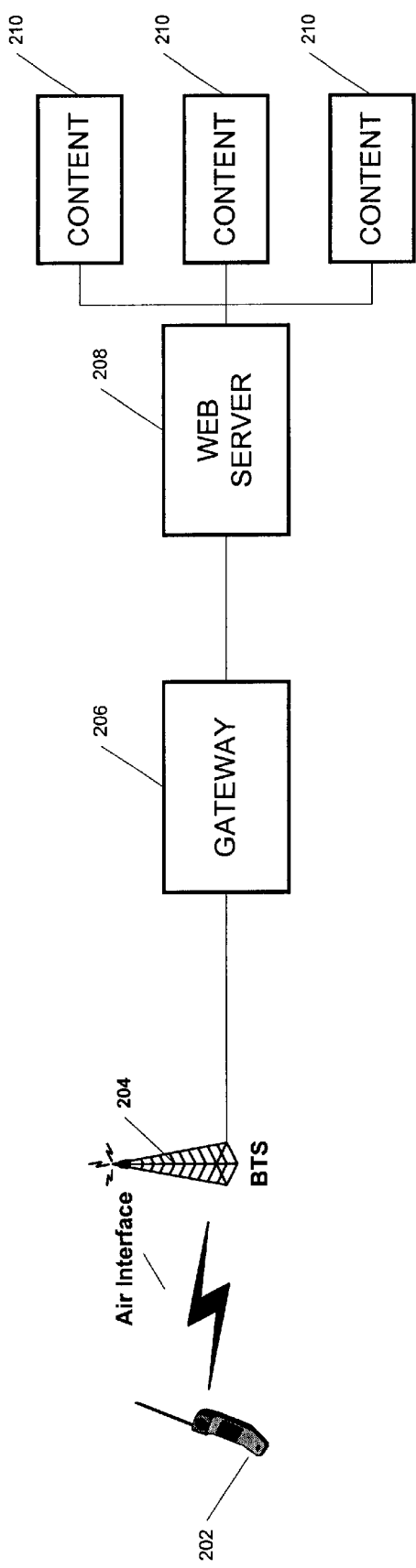
FIG. 2 is a block diagram illustrating an exemplary wireless data network in which the device of FIG. 1 operates.

In implementations that do not have an I/O port, it may be more convenient to program the server rather than the device. In these types of implementations, the user of the device may want the server to provide authentication before releasing information to the network. FIG. 2 illustrates the general situation, where there are multiple content sites 210, i.e., web sites connected to a web server 208. Web server 208 interfaces to a gateway that transmits information to and from mobiles 202 using base transceiver station (BTS) 204. To prevent the sites 210 from sending unwanted solicitations and messages, mobile 202 may require authentication from server 208. In addition, server 208 may require authentication of mobile 202 to ensure it is providing service to an actual user of the device. Therefore, in one implementation, each server 208 is identified by an associated PIN, which may be partially comprised of its IP address. Moreover, gateway 206 is typically a WAP gateway. Therefore, building extensions to WAP can carry out the authentication process.

Again, referring back to FIG. 1, recorder 106 may record information related to location information requests in a location database 108. For example, recorder 106 may record any of the following information: the time of the request; the date of the request; a network identifier of the requesting entity; the location of the mobile at the time of the request; and/or a reason for the request. In most communications systems, the network provides date and time information. Similarly, the network identifier is usually provided. For example, the SID/NID can be used in a CDMA system, the PLMN in a GSM system, and the SID/SOC in an IS-136 system.

The reasons associated with the request can be provided through tracking messages that are stored in location database 108. For example, the tracking message may be a predetermined or "canned" message indicating the reason for the location information request. The predetermined messages may be "malfunctioning mobile," "radio coverage quality survey," etc. The benefit of systems that use predetermined tracking messages is that they only require a few bits, making them bandwidth efficient. On the other hand, certain implementations use free form text messages to track the location information requests. The benefit of the free form text tracking message is increased flexibility and expansion of messages. Of course, some implementations use a combination of predetermined and free form text tracking messages.

In certain implementations, device 100 uses I/O port 110 to download the location database to an external device for post-processing. For example, I/O port 110 can utilize a cable to interface to an external device or it can use a wireless connection. Examples of wireless connections would be an infrared connection such as an IrDA link, or a short-range RF connection such as Bluetooth or HomeRF link.

The post-processing can, depending on the implementation, perform a variety of functions. For example, in addition to recording the position when a location information request is received, device 100 my have stored position information on a periodic basis or whenever the user requested device 100 to store the position. With each storage instance, auxiliary information such as date and time-of-day and network identifier can also be stored. This set of data can later be retrieved by the post-processing device to plot a route, calculate traveled distance and speed, or correlated with other events stored in device 100 or in the external device. For example, the set of positions can be overlaid on a map showing the route. This post-processing can preferably be performed on a laptop or PDA which may host an application for the post-processing and a map unless device 100 has these capabilities and a relatively large device (device 100 may be a PDA itself). It could be argued that there is no need for location privacy for device 100 in the vicinity of another device since this other device could determine the location itself and by definition, the devices are very close to each other. The scenario above, however, with past data (past locations with time stamp) illustrates the sensitive nature of the situation. The user may have an interest in the privacy of his location database 108 even with respect to devices in close vicinity. Thus, the release of the content in the location database 108 should be controlled. Access could preferably be controlled by an application specific PIN code. When attempting to access the location database 108 the application in the mobile device should preferably request a PIN.

If a companion device is connected to the mobile device via a cable, the privacy scenario is very similar to accessing location database 108 at the mobile device itself. Thus, in one implementation, a PIN code entry through the mobile input device 114 is still required for the access of the location database 108 on the mobile device itself. For example, the user of the device may lend his mobile device to someone else and would not necessarily want that person to be able to access the location database.

In certain implementations, positioner 102, request processor 104, and recorder 106, are implemented as software functions. As such, they may be embodied in a computer program that may reside, depending on the implementation, in the firmware or software of device 100. In an alternative implementation, the computer program resides on an external media, such as a flash or SIM card that is inserted into device 100. In this case, the computer program may be loaded into the mobile device and executed locally, or it may be executed from the external media.

Figure 3:
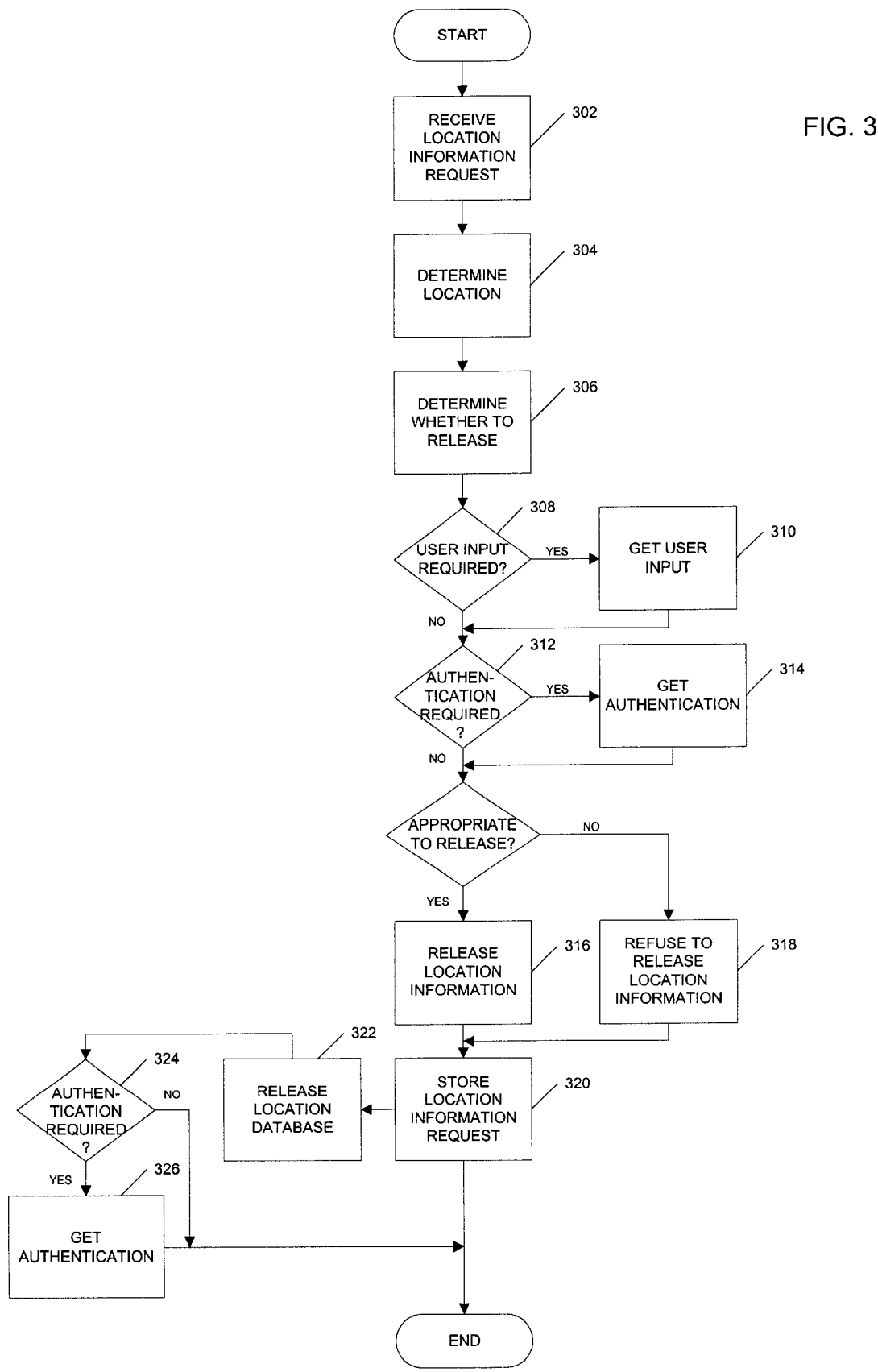
FIG. 3 is a process flow diagram illustrating a preferred method of handling requests for information relating to the location of a mobile device.

Additionally, there is also provided a method for releasing mobile device location information. FIG. 3 illustrates the steps involved. First, in step 302, the location of the mobile device is determined. For example, a positioner such as positioner 102 may determine the location. Then, in step 304, a location information request is received. Request processor 104, for example, may receive a location information request. After receiving a request in step 304, whether to actually release the location information is determined in step 306. For example, in one implementation, the determination to release the information is made in response to all network management location information requests. In another embodiment, the determination to release the information is made whenever the request is the result of a user initiated emergency call.

In some implementations, user input is required to make the release determination. This is illustrated by step 308. In this case, the user input is obtained in step 310. It should be noted that this user input may be provided ahead of time or it may be provided as the determination is being made. In other implementations, authentication of the requesting entity is required. This is illustrated by step 312. In this case, authentication is obtained in step 314.

If it is determined that releasing the information is appropriate, then in step 316, the information is released. But if it is determined that it is not appropriate, then in step 318, the request is refused. In certain implementations, information related to the request is stored (step 320) whether the information was released or not. In further implementations, the stored information is released (step 322) for post-processing. As illustrated by step 324, this step may also require authentication. In which case, authentication is obtained in step 326.

Those skilled in the art will realize that there are a variety of mobile device. To the extent that the above examples are presented in relation to a mobile device, they are not intended to limit the invention to any particular mobile device implementation. Those skilled in the art will understand that any mobile device that needs to determine its position, and whether or not to release that position, will be able to utilize the invention. Thus, the preceding examples are by way of explanation only and are not intended to limit the scope of the invention in any way.

What is claimed is:

1. A device, comprising:
   a positioner for deriving location information regarding a position of the device;
   a user control file configured to provide selection of modes for responding to requests for the location information, said modes comprising:
   autonomous release of the location information by the device without providing notification of the request; and
   autonomous release of the location information by the device including providing notification of the request; and
   optional release of the location information by the device based on input to the device; and
   a request processor for processing and selectively responding to requests for the location information based on the selected mode.

2. The device of claim 1, wherein the positioner comprises a GPS receiver.

3. The device of claim 2, wherein the position of the device is derived by a communication network in which the device operates based on the location information.

4. The device of claim 1, wherein the device is configured to receive network management location information requests from a communications network in which the device operates, and wherein the request processor is configured to automatically respond to certain network management location information requests regardless of the selected mode.

5. The device of claim 4, wherein the network management location information requests relate to at least one of the following:
   verifying adequate radio coverage;
   assistance in handoff procedures;
   tracking stolen devices;
   monitoring malfunctioning devices; and
   location based billing.

6. The device of claims 4, wherein the device stores reasons for the network management location information requests provided by the communications network.

7. The device of claim 1, wherein the device is configured to initiate emergency communications, and wherein the request processor is configured to automatically respond to requests for location information that result from the emergency communications regardless of the selected mode.

8. The device of claim 7, wherein the device further comprises a timer, and wherein the request processor is configured to automatically respond to a request for location information resulting from an emergency communication initiated by the device, if the request occurs within a time window defined by the timer.

9. The device of claim 1, wherein the request processor is configured to automatically respond to certain requests from specified agencies regardless of the selected mode.

10. The device of claim 1, wherein the request processor is configured to respond to a service or an event based on the input programmed into the device.

11. The device of claim 10, wherein the service or event is in proximity of the location of the device.

12. The device of claim 1, further comprising a memory, wherein the device is configured to store information related to some of the location information requests in the memory.

13. The device of claim 12, wherein the information stored in memory related, to the location information requests includes at least one of the following:
- time and date of the location information request;
- location of the device at the time of the location information request;
- a network identifier, identifying a communications network in which the device operates; and
- a message indicating a reason for the request.

14. The device of claim 13, wherein the message indicating the reason for the location information request comprises a predetermined message, a free form text message, or a combination of predetermined and free form text message.

15. The device of claim 12, further comprising a user interface, for providing access to the information stored in memory.

16. The device of claim 15 wherein the user interface is configured to authenticate a source requesting access to the information stored in the memory through a PIN provided by the source.

17. The device of claim 1, wherein the request processor is implemented in software.

18. The device of claim 1, wherein the request processor is further configured to authenticate source of the request before releasing the location information.

19. The device of claim 18, wherein the request processor uses a PIN or an IP address associated with the source to authenticate the source.

20. The device of claim 1, wherein the device is configured to release the user control file to a communications network in which the device operates in response to a request for the user control file from the communications network.

* * * * *